United States Patent
Matias et al.

(10) Patent No.: US 10,229,719 B1
(45) Date of Patent: Mar. 12, 2019

(54) SYSTEMS AND METHODS FOR GENERATING HIGHLIGHTS FOR A VIDEO

(71) Applicant: GOPRO, INC., San Mateo, CA (US)

(72) Inventors: Joven Matias, Cardiff, CA (US); Tyler Gee, San Francisco, CA (US); James Balnaves, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 18 days.

(21) Appl. No.: 15/150,400

(22) Filed: May 9, 2016

(51) Int. Cl.
*G11B 27/34* (2006.01)
*G06K 9/20* (2006.01)
*G06K 9/00* (2006.01)

(52) U.S. Cl.
CPC .......... *G11B 27/34* (2013.01); *G06K 9/00718* (2013.01); *G06K 9/2081* (2013.01)

(58) Field of Classification Search
USPC .................................. 386/239–248, 278–290
See application file for complete search history.

(56) References Cited

U.S. PATENT DOCUMENTS

| | | |
|---|---|---|
| 6,633,685 B1 | 10/2003 | Kusama |
| 7,512,886 B1 | 3/2009 | Herberger |
| 7,885,426 B2 | 2/2011 | Golovchinsky |
| 7,970,240 B1 | 6/2011 | Chao |
| 8,180,161 B2 | 5/2012 | Haseyama |
| 8,196,168 B1 * | 6/2012 | Bryan .................. G11B 27/002 725/134 |
| 8,606,073 B2 | 12/2013 | Woodman |
| 8,774,560 B2 | 7/2014 | Sugaya |
| 8,971,623 B2 | 3/2015 | Galt |
| 8,990,328 B1 | 3/2015 | Grigsby |
| 9,041,727 B2 | 5/2015 | Ubillos |
| 9,142,257 B2 | 9/2015 | Woodman |
| 9,342,376 B2 | 5/2016 | Jain |
| 9,418,283 B1 | 8/2016 | Natarajan |
| 2002/0165721 A1 | 11/2002 | Chang |

(Continued)

FOREIGN PATENT DOCUMENTS

| | | |
|---|---|---|
| JP | H09181966 A | 7/1997 |
| JP | 2005252459 A | 9/2005 |

(Continued)

OTHER PUBLICATIONS

PCT International Written Opinion for PCT/US2015/041624, dated Dec. 17, 2015, 7 Pages.

(Continued)

*Primary Examiner* — Hung Q Dang
(74) *Attorney, Agent, or Firm* — Esplin & Associates, PC

(57) ABSTRACT

This disclosure relates to systems and methods that generate highlights for a video. A video may be accessed. Criteria for identifying a moment of interest within the video based on a user interaction with a portion of the video may be obtained. Interaction information indicating the user interaction with the portion of the video may be received. The interaction information for the portion of the video may be compared with the criteria. Responsive to the interaction information for the portion of the video indicating the user interaction with the portion of the video satisfying the criteria, a moment in the video corresponding to the portion of the video may be associated with the moment of interest.

20 Claims, 6 Drawing Sheets

(56) References Cited

U.S. PATENT DOCUMENTS

| | | |
|---|---|---|
| 2004/0001706 A1 | 1/2004 | Jung |
| 2005/0025454 A1 | 2/2005 | Nakamura |
| 2005/0108031 A1 | 5/2005 | Grosvenor |
| 2005/0163481 A1* | 7/2005 | Hirai ............... G11B 27/105 |
| | | 386/248 |
| 2005/0198018 A1 | 9/2005 | Shibata |
| 2006/0080286 A1 | 4/2006 | Svendsen |
| 2006/0115108 A1 | 6/2006 | Rodriguez |
| 2008/0123976 A1 | 5/2008 | Coombs |
| 2008/0183843 A1 | 7/2008 | Gavin |
| 2009/0019995 A1 | 1/2009 | Miyajima |
| 2009/0027499 A1 | 1/2009 | Nicholl |
| 2009/0077459 A1* | 3/2009 | Morris ............... H04N 5/44508 |
| | | 715/201 |
| 2009/0125559 A1* | 5/2009 | Yoshino ............... G11B 27/322 |
| 2009/0157605 A1* | 6/2009 | Kelly ................... G06F 17/3012 |
| 2009/0252474 A1* | 10/2009 | Nashida ............... G11B 27/034 |
| | | 386/248 |
| 2010/0046842 A1 | 2/2010 | Conwell |
| 2010/0086216 A1 | 4/2010 | Lee |
| 2010/0161720 A1 | 6/2010 | Colligan |
| 2010/0199182 A1 | 8/2010 | Lanza |
| 2010/0274714 A1 | 10/2010 | Sims |
| 2010/0318660 A1 | 12/2010 | Balsubramanian |
| 2011/0103700 A1 | 5/2011 | Haseyama |
| 2011/0137156 A1 | 6/2011 | Razzaque |
| 2011/0170086 A1 | 7/2011 | Oouchida |
| 2011/0206351 A1 | 8/2011 | Givoly |
| 2011/0242098 A1 | 10/2011 | Tamaru |
| 2012/0014673 A1 | 1/2012 | O'Dwyer |
| 2012/0027381 A1 | 2/2012 | Kataoka |
| 2012/0030263 A1 | 2/2012 | John |
| 2012/0141019 A1 | 6/2012 | Zhang |
| 2012/0210205 A1 | 8/2012 | Sherwood |
| 2012/0210228 A1 | 8/2012 | Wang |
| 2012/0246114 A1 | 9/2012 | Edmiston |
| 2012/0283574 A1 | 11/2012 | Park |
| 2013/0182166 A1 | 7/2013 | Shimokawa |
| 2013/0235071 A1 | 9/2013 | Ubillos |
| 2013/0239051 A1 | 9/2013 | Albouze |
| 2013/0330019 A1 | 12/2013 | Kim |
| 2014/0149865 A1 | 5/2014 | Tanaka |
| 2014/0152762 A1 | 6/2014 | Ukil |
| 2014/0280095 A1* | 9/2014 | Friedman ........... G06Q 30/0214 |
| | | 707/723 |
| 2014/0280879 A1* | 9/2014 | Skolicki ............... H04L 67/22 |
| | | 709/224 |
| 2014/0282661 A1* | 9/2014 | Martin ............. H04N 21/23418 |
| | | 725/18 |
| 2015/0039646 A1 | 2/2015 | Sharifi |
| 2015/0071547 A1 | 3/2015 | Keating |
| 2015/0113009 A1 | 4/2015 | Zhou |
| 2015/0156247 A1 | 6/2015 | Hensel |
| 2015/0237389 A1* | 8/2015 | Grouf ............... H04N 21/26283 |
| | | 725/49 |
| 2015/0244972 A1* | 8/2015 | Pulido ..................... H04N 5/91 |
| | | 386/295 |
| 2015/0287435 A1 | 10/2015 | Land |
| 2016/0029105 A1 | 1/2016 | Newman |
| 2016/0094601 A1 | 3/2016 | Besehanic |
| 2016/0103830 A1 | 4/2016 | Cheong |
| 2016/0189752 A1 | 6/2016 | Galant |
| 2016/0226804 A1* | 8/2016 | Hampson ............... H04L 51/10 |
| 2016/0260000 A1 | 9/2016 | Yamakawa |
| 2016/0286235 A1* | 9/2016 | Yamamoto ............. H04N 19/70 |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2006001361 A1 | 1/2006 |
| WO | 2009040538 | 4/2009 |
| WO | 2012057623 | 5/2012 |
| WO | 2012057623 A1 | 5/2012 |
| WO | 2012086120 A1 | 6/2012 |

OTHER PUBLICATIONS

PCT International Search Report and Written Opinion for PCT/US15/12086 dated Mar. 17, 2016, 20 pages.

Schroff et al., "FaceNet: A Unified Embedding for Face Recognition and Clustering," IEEE Conference on Computer Vision and Pattern Recognition (CVPR), 2016, 10 pgs.

Parkhi et al., "Deep Face Recognition," Proceedings of the British Machine Vision, 2015, 12 pgs.

Iandola et al., "SqueezeNet: AlexNet-level accuracy with 50x fewer parameters and <0.5MB model size," arXiv:1602.07360, 2016, 9 pgs.

Ioffe et al., "Batch Normalization: Accelerating Deep Network Training by Reducing Internal Coyariate Shift," arXiv:1502.03167, 2015, 11 pgs.

He et al., "Deep Residual Learning for Image Recognition," arXiv:1512.03385, 2015, 12 pgs.

Han et al., Deep Compression: Compressing Deep Neural Networks with Pruning, Trained Quantization and Huffman Coding, International Conference on Learning Representations 2016, 14 pgs.

PCT International Search Report and Written Opinion for PCT/US2015/023680, dated Oct. 6, 2015, 13 pages.

Iandola et al., "SqueezeNet: AlexNet-level accuracy with 50x fewer parameters and <0.5MB model size", arXiv:1602.07360v3 [cs.CV] Apr. 6, 2016 (9 pgs.).

Yang et al., "Unsupervised Extraction of Video Highlights Via Robust Recurrent Auto-encoders" arXiv:1510.01442v1 [cs.CV] Oct. 6, 2015 (9 pgs).

Tran et al., "Learning Spatiotemporal Features with 3D Convolutional Networks", arXiv:1412.0767 [cs.CV] Dec. 2, 2014 (9 pgs).

PCT International Search Report for PCT/US15/41624 dated Nov. 4, 2015, 5 pages.

PCT International Search Report for PCT/US15/23680 dated Aug. 3, 2015, 4 pages.

PSonar URL: http://www.psonar.com/about retrieved on Aug. 24, 2016, 3 pages.

PCT International Preliminary Report on Patentability for PCT/US2015/023680, dated Oct. 4, 2016, 10 pages.

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

FFmpeg, "Demuxing," Doxygen, Dec. 5, 2014, 15 Pages, [online] [retrieved on Jul. 13, 2015] Retrieved from the Internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the Internet <URL: https://www.ffmpeg.org/doxyg en/2. 3/structA VP a ck et. html>.

Japanese Office Action for JP Application No. 2013-140131, dated Aug. 5, 2014, 6 pages.

Office Action for U.S. Appl. No. 13/831,124, dated Mar. 19, 2015, 14 pages.

* cited by examiner

SYSTEMS AND METHODS FOR GENERATING HIGHLIGHTS FOR A VIDEO

FIELD

This disclosure relates to systems and methods that generate highlights for a video.

BACKGROUND

Video applications may allow a user to manually identify highlight moments within a video. Manually identifying highlight moments may be time consuming and may discourage users from identifying highlight moments.

SUMMARY

This disclosure relates to generating highlights for a video. A video may be accessed. Criteria for identifying a moment of interest within the video based on a user interaction with a portion of the video may be obtained. Interaction information indicating the user interaction with the portion of the video may be received. The interaction information for the portion of the video may be compared with the criteria. Responsive to the interaction information for the portion of the video indicating the user interaction with the portion of the video satisfying the criteria, a moment in the video corresponding to the portion of the video may be associated with the moment of interest.

A system that generates highlights for a video may include one or more physical processors, and/or other components. The one or more physical processors may be configured by machine-readable instructions. Executing the machine-readable instructions may cause the one or more physical processors to facilitate generating highlights for a video. The machine-readable instructions may include one or more computer program components. The computer program components may include one or more of an access component, a criteria component, an interaction information component, a comparison component, an association component, and/or other computer program components.

The access component may be configured to access one or more videos and/or other information. The access component may access one or more videos and/or other information stored in electronic storage and/or in other locations. A video may include a video clip captured by a video capture device, multiple video clips captured by a video capture device, and/or multiple video clips captured by separate video capture devices. A video may include multiple video clips captured at the same time and/or multiple video clips captured at different times. A video may include a video clip processed by a video application, multiple video clips processed by a video application and/or multiple video clips processed by separate video applications.

The criteria component may be configured to obtain one or more criteria for identifying a moment of interest within a video based on one or more user interactions with a portion of the video. A user interaction with a portion of a video may include a consumption of the portion of the video, a transformation of the portion of the video, and/or other user interactions with the portion of the video. In some implementations, a user interaction with a portion of the video that satisfies one or more criteria for identifying a moment of interest within a video may include viewing of the portion of the video, selection of the portion of the video, zooming on the portion of the video, sharing of the portion of the video, extraction of an image from the portion of the video, a visual modification of the portion of the video, a timing modification of the portion of the video, an audio modification of the portion of the video, and/or other user interactions with the portion of the video.

The interaction information component may be configured to receive interaction information. Interaction information may indicate one or more user interactions with a portion of a video. Interaction information may be received at a time or over a period of time. Interaction information may be received based on one or more user input. One or more user input may be received via one or more graphical user interfaces of one or more video applications.

The comparison component may be configured to compare interaction information for a portion of a video with one or more criteria for identifying a moment of interest within the video. Based on the comparison, the comparison component may be configured to determine whether the interaction information for the portion of the video satisfies one or more criteria for identifying the moment of interest within the video.

The association component may be configured to, responsive to interaction information for a portion of the video indicating one or more user interactions with the portion of the video satisfying one or more criteria, associate a moment in the video corresponding to the portion of the video with the moment of interest. In some implementations, the association component may be further configured to, responsive to interaction information for a portion of the video indicating one or more user interactions with the portion of the video satisfying one or more criteria, associate a moment in a high resolution video corresponding to the portion of the video with the moment of interest. The high resolution video may be characterized by a higher resolution than the video. The high resolution video may be characterized by a higher framerate than the video.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
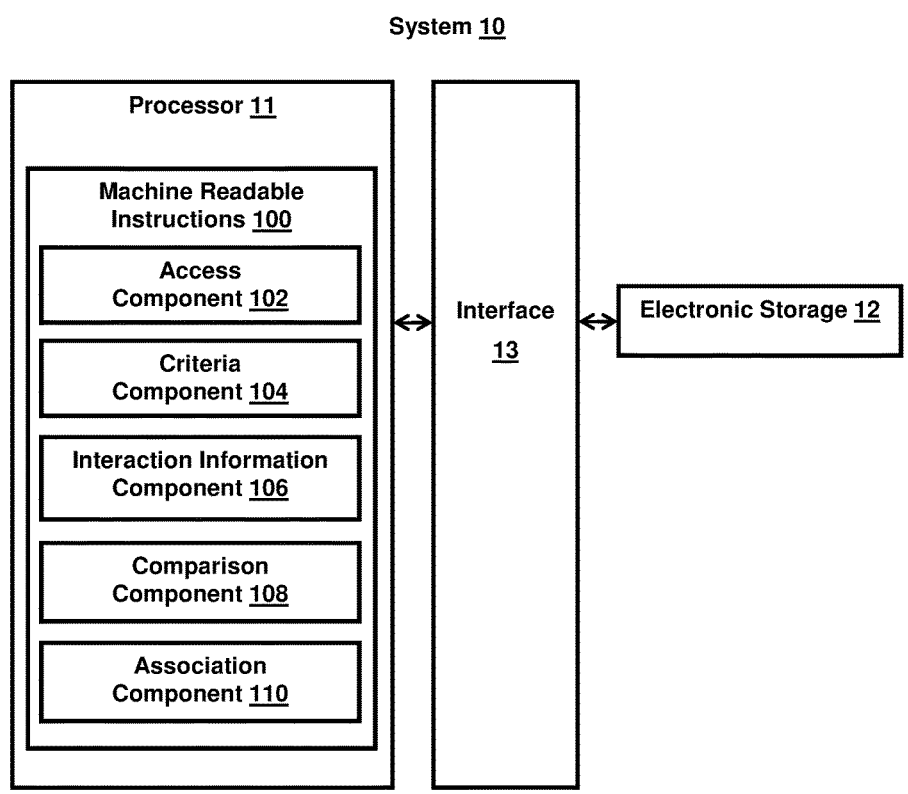
FIG. 1 illustrates a system for generating highlights for a video.

FIG. 1 illustrates system 10 for generates highlights for a video. System 10 may include one or more of processor 11, electronic storage 12, interface 13 (e.g., bus, wireless interface, etc.), and/or other components. A video may be accessed by processor 11. Criteria for identifying a moment of interest within the video based on a user interaction with a portion of the video may be obtained. Interaction information indicating the user interaction with the portion of the video may be received. The interaction information for the portion of the video may be compared with the criteria. Responsive to the interaction information for the portion of the video indicating the user interaction with the portion of the video satisfying the criteria, a moment in the video corresponding to the portion of the video may be associated with the moment of interest.

Figure 3:
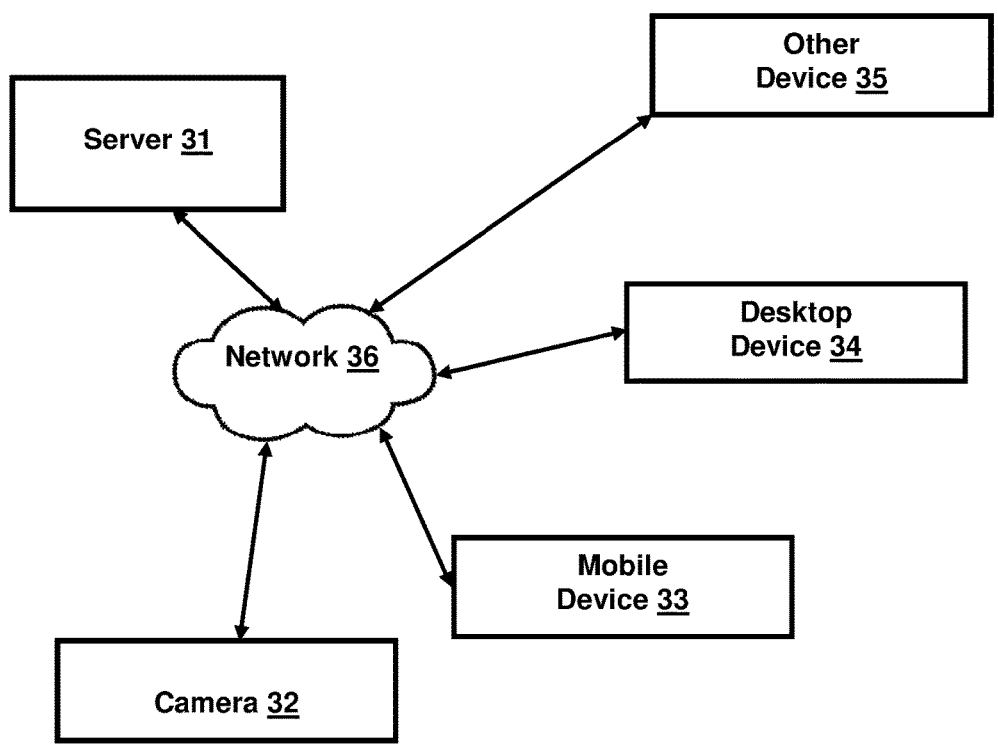
FIG. 3 illustrates exemplary devices connected to a network.

System 10 may be embodied in a single device or multiple devices. For example, FIG. 3 illustrates exemplary devices connected via network 36. Devices connected via network 36 may include server 31, camera 32, mobile device 33, desktop device 34, and/or other device 35. Devices may be connected via other communication interface (e.g., bus, wireless interface, etc.). As a non-limiting example, system 10 may be embodied in one of the devices shown in FIG. 3 or in multiple devices shown in FIG. 3.

For example, one or more functionalities described herein to processor 11 for generating highlights for a video may be performed by a device containing electronic storage 12 and/or a device separate from electronic storage 12. For example, one or more functionalities described herein to processor 11 for generating highlights for a video may be included in camera 32 and the video may be stored in electronic storage of camera 32. Camera 32 may be used to generate highlights for the video stored in electronic storage of camera 32. One or more functionalities described herein to processor 11 for generating highlights for a video may be included in mobile device 33 and the video may be stored in electronic storage of camera 32. Mobile device 33 may be used to generate highlights for the video stored in electronic storage of camera 32. Other uses of single devices and combinations of devices to generate highlights for a video are contemplated.

Electronic storage 12 may include electronic storage medium that electronically stores information. Electronic storage 12 may store software algorithms, information determined by processor 11, information received remotely, and/or other information that enables system 10 to function properly. For example, electronic storage 12 may store information relating to videos, criteria for identifying a moment of interest, interaction information, user interactions with portion of videos, moments of interest, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate generating highlights for a video. Machine-readable instructions 100 may include one or more computer program components. Machine readable instructions 100 may include one or more of access component 102, criteria component 104, interaction information component 106, comparison component 108, association component 110, and/or other computer program components.

Access component 102 may be configured to access one or more videos and/or other information. A video may include a video clip captured by a video capture device, multiple video clips captured by a video capture device, and/or multiple video clips captured by separate video capture devices. A video may include multiple video clips captured at the same time and/or multiple video clips captured at different times. A video may include a video clip processed by a video application, multiple video clips processed by a video application and/or multiple video clips processed by separate video applications.

Access component 102 may access one or more videos and/or other information stored in electronic storage (e.g., electronic storage 12, etc.) and/or in other locations. Access component 102 may be configured to access one or more videos and/or other information during acquisition of the video or after acquisition of the video. For example, access component 102 may access a video while the video is being captured by one or more cameras/image sensors. Access component 102 may obtain a video after the video has been captured and stored in memory (e.g., electronic storage 12, etc.).

Criteria component 104 may be configured to obtain one or more criteria for identifying a moment of interest within a video based on one or more user interactions with a portion of the video. A portion of a video may correspond to a point in time within a video or a duration of time within the video. A user interaction with a portion of a video may refer to one or more actions prompted by a user on the portion of the video. A user interaction with a portion of a video may occur at an instant in time or over a period of time during a play back duration of the video. A user interaction with a portion of a video may include a consumption of the portion of the video, a transformation of the portion of the video, and/or other user interactions with the portion of the video. A portion of the video may refer to image and/or audio information at a specific instant or over a period of time within the playback duration of the video. A consumption of a portion of a video may refer to an action prompted by a user relating to viewing the portion of the video. A transformation of a portion of a video may refer to an action prompted by a user relating to changes in the portion of the video.

In some implementations, a user interaction with a portion of the video that satisfies one or more criteria for identifying a moment of interest within a video may include viewing of the portion of the video. One or more criteria may require one or more particular viewings of the portion of the video. A particular viewing of the portion of the video may include a single viewing of the portion of the video. For example, one or more criteria may require a user interaction with the portion of the video to view the portion of the video at least once. The portion of the video may be required to be viewed within a certain duration of time. For example, the portion of the video may be required to be viewed within a certain duration of time after the video has been captured, stored, received, and/or accessed.

A particular viewing of the portion of the video may include repeated viewing of the portion of the video. For example, one or more criteria may require a user interaction with the portion of the video to view the portion of the video a certain number of times. The portion of the video may be required to be repeatedly viewed within a certain duration of time. For example, the portion of the video may be required to be repeatedly viewed within a certain duration of time after the video has been captured, stored, received, and/or accessed. The portion of the video may be required to be repeatedly viewed without viewing other portions of the video and/or other videos. For example, the portion of the video may be required to be viewed twice in a row.

A particular viewing of the portion of the video may include pausing the viewing during the portion of the video. For example, one or more criteria may require a user interaction with the portion of the video to pause the viewing during the portion of the video for at least an instance or for a certain duration of time. A certain duration of time may include a maximum duration after which the one or more criteria may not be satisfied. For example, a criteria may require a portion of a video to be paused for more than 5 seconds but not more than 2 minutes. Setting a maximum duration may prevent a pause of a portion of the video from satisfying one or more criteria when a user is otherwise inactive with the portion of the video (e.g., a user has stepped away from a device showing the portion of the video after pausing the video, etc.). A maximum duration may not apply if a user is active with the portion of the video while the portion of the video is paused (e.g., a user is editing a portion of the video and/or obtaining information about the portion of the video while the portion of the video is paused, etc.).

A particular viewing of the portion of the video may include viewing the portion of the video at a certain speed. For example, one or more criteria may require a user interaction with the portion of the video to change the speed at which the portion of the video is viewed. One or more criteria may require the viewing speed of the portion of the video to be slowed (e.g., from 1× speed to 0.5× speed, from 4× speed to 1× speed, etc.). One or more criteria may require the viewing speed of the portion of the video to be increased (e.g., from 1× speed to 2× speed, from 0.25× speed to 2× speed, etc.). One or more criteria may require the viewing speed of the portion of the video to be increased and slowed.

A particular viewing of the portion of the video may include seeking and playing the portion of the video. For example, one or more criteria may require a user interaction with the portion of the video to fast forward and/or reverse to the portion of the video and view the portion of the video. One or more criteria may require the fast forward and/or reverse to be accomplished at a certain speed, under a certain speed, or over a certain speed.

A particular viewing of the portion of the video may include playing the portion of the video based on a suggestion. For example, one or more criteria may require a user interaction with the portion of the video to view the portion of the video based on a suggestion to view the portion from another user, from a video application (e.g., automatic suggestion of highlights from visual/metadata analysis, etc.), and/or from other suggestion sources. Other particular views of the portion of the video are contemplated.

In some implementations, a user interaction with a portion of the video that satisfies one or more criteria for identifying a moment of interest within a video may include selection of the portion of the video. One or more criteria may require one or more particular selections of the portion of the video. A particular selection of the portion of the video may include a single selection of the portion of the video. For example, one or more criteria may require a user interaction with the portion of the video to select the portion of the video at least once (e.g., selecting a portion of a video between 0.5 seconds and 5 seconds time interval, etc.).

A particular selection of the portion of the video may include repeated selection of the portion of the video. For example, one or more criteria may require a user interaction with the portion of the video to select the portion of the video a certain number of times. The portion of the video may be required to be repeatedly selected within a certain duration of time. For example, the portion of the video may be required to be repeatedly selected within a certain duration of time after the video has been captured, stored, received, and/or accessed.

A particular selection of the portion of the video may include using a pointer (e.g., a cursor, etc.) to hover over the portion of the video. For example, one or more criteria may require a user interaction with the portion of the video to hover a pointer over the portion of the video for a certain duration time. A certain duration of time may include a maximum duration after which the one or more criteria may not be satisfied. For example, one or more criteria may require hovering over a portion of a video for more than 1 seconds but not more than 1 minute. Setting a maximum duration may prevent a hovering over a portion of the video from satisfying one or more criteria when a user is otherwise inactive with the portion of the video (e.g., a user has stepped away from a device showing the portion of the video after leaving the cursor hovering over the portion of the video, etc.). A maximum duration may not apply if a user is active with the portion of the video while hovering over the portion of the video (e.g., a user is editing a portion of the video and/or obtaining information about the portion of the video while hovering over the portion of the video, etc.). Other particular selections of the portion of the video are contemplated.

In some implementations, a user interaction with a portion of the video that satisfies one or more criteria for identifying a moment of interest within a video may include zooming on the portion of the video. One or more criteria may require one or more particular zooms on the portion of the video. A particular zoom on the portion of the video may include increasing or decreasing a zoom level at which the portion of the video is viewed. For example, one or more criteria may require a user interaction with the portion of the video to view the portion of the video at 2× zoom level. One or more criteria may require a user interaction with the portion of the video to change the zoom level once or multiple times (e.g., from 1× zoom to 2× zoom to 0.5× zoom, etc.). Other particular zooms of the portion of the video are contemplated.

In some implementations, a user interaction with a portion of the video that satisfies one or more criteria for identifying a moment of interest within a video may include sharing of the portion of the video. One or more criteria may require one or more particular sharing of the portion of the video. A particular sharing of the portion of the video may include sharing one or images from the portion of the video and/or sharing one or more video clips from the portion of the video. For example, one or more criteria may require a user interaction with the portion of the video to share a single image from the portion of the video, share multiple images from the portion of the video, share a video clip corresponding to the portion of the video, and/or share video clips corresponding to the portion of the video. Other particular sharing of the portion of the video are contemplated.

In some implementations, a user interaction with a portion of the video that satisfies one or more criteria for identifying a moment of interest within a video may include extraction of an image or a video clip from the portion of the video. One or more criteria may require one or more particular extractions of the portion of the video. A particular extraction of the portion of the video may include extracting one or images from the portion of the video and/or extracting one or more video clips from the portion of the video. For example, one or more criteria may require a user interaction with the portion of the video to extract a single image from the portion of the video, extract multiple images from the portion of the video, extract a video clip corresponding to the portion of the video, and/or extract one or more video clips corresponding to the portion of the video. Other particular extractions of the portion of the video are contemplated.

In some implementations, a user interaction with a portion of the video that satisfies one or more criteria for identifying a moment of interest within a video may include a visual modification of the portion of the video. One or more criteria may require one or more particular visual modifications of the portion of the video. A particular visual modification of the video may include one or more changes in visuals to one or more images and/or one or more video clips from the portion of the video. For example, one or more criteria may require a user interaction with the portion of the video to transform one or more visual characteristics of a single image from the portion of the video, multiple images from the portion of the video, a video clip corresponding to the portion of the video, and/or video clips corresponding to the portion of the video. One or more transformations of visual characteristics may include cropping, color changes, brightness changes, contrast changes, image warping, image blurring, aspect ratio changes, resolution changes, framerate changes, transition effects, special effects, addition of visuals (e.g., other image, video, text, color, etc.), removal of visuals, and/or other changes in visuals. Other particular visual modifications of the portion of the video are contemplated.

In some implementations, a user interaction with a portion of the video that satisfies one or more criteria for identifying a moment of interest within a video may include a timing modification of the portion of the video. One or more criteria may require one or more particular timing modifications of the portion of the video. A particular timing modification of the video may include one or more changes in timing of one or more parts of the video. For example, one or more criteria may require a user interaction with the portion of the video to change a length and/or a speed of a portion of the video. A change in length and/or speed of a portion of a video may be local (specific to a part of the portion of the video) or global (applicable to the entire portion of the video). As non-limiting examples, a change in length of a portion of a video may include increasing the length of a portion of a video, decreasing the length of a portion of a video, trimming a portion of a video, and/or other changes in length of a portion of a video. As non-limiting example, a change in speed of a portion of a video may include a slow motion effect, a fast motion effect, a time freeze effect, a speed ramp effect, and/or other changes in speed of a portion of a video. A slow motion effect may decrease the speed with which a portion of a video may be presented during playback. A fast motion effect may increase the speed with which a portion of a video may be presented during playback. A slow motion effect and/or a fast motion effect may be linear or dynamic. A time freeze effect may, for a duration of time, freeze a portion of a video. A speed ramp effect may decrease the speed with which a part of a portion of a video may be presented during playback and increase the speed with which another part of the portion of a video may be presented during playback. Other particular timing modifications of the portion of the video are contemplated.

In some implementations, a user interaction with a portion of the video that satisfies one or more criteria for identifying a moment of interest within a video may include an audio modification of the portion of the video. One or more criteria may require one or more particular audio modifications of the portion of the video. A particular audio modification of the video may include one or more changes in audio within the portion of the video. For example, one or more criteria may require a user interaction with the portion of the video to transform one or more audio characteristics of one or more audio within the portion of the video. One or more transformations of audio characteristics may include changes to a beat, a tempo, a rhythm, a volume, a frequency, a start, an end, and/or other audio characteristics. Other particular audio modifications of the portion of the video are contemplated.

In some implementations, a user interaction with a portion of the video that satisfies one or more criteria for identifying a moment of interest within a video may include one or more of the user interactions described above and/or other user interactions of the portion of the video. For example, one or more criteria may require one or more particular visual modifications of the portion of the video and one or more sharing of the portion of the video.

Interaction information component 106 may be configured to receive interaction information. Interaction information may indicate one or more user interactions with a portion of a video. Interaction information may be received at a time or over a period of time. Interaction information may be received based on one or more user input. One or more user input may be received via one or more graphical user interfaces of one or more video applications. A video application may refer to one or more software, one or more software running on one or more hardware, and/or other applications operating to present video on a display. As a non-limiting example, a video application may include one or more of video viewer, video editor, and/or other video applications. As a non-limiting example, a video application may run on one or more of a mobile device, a desktop device, a camera, and/or other hardware.

Figure 4:
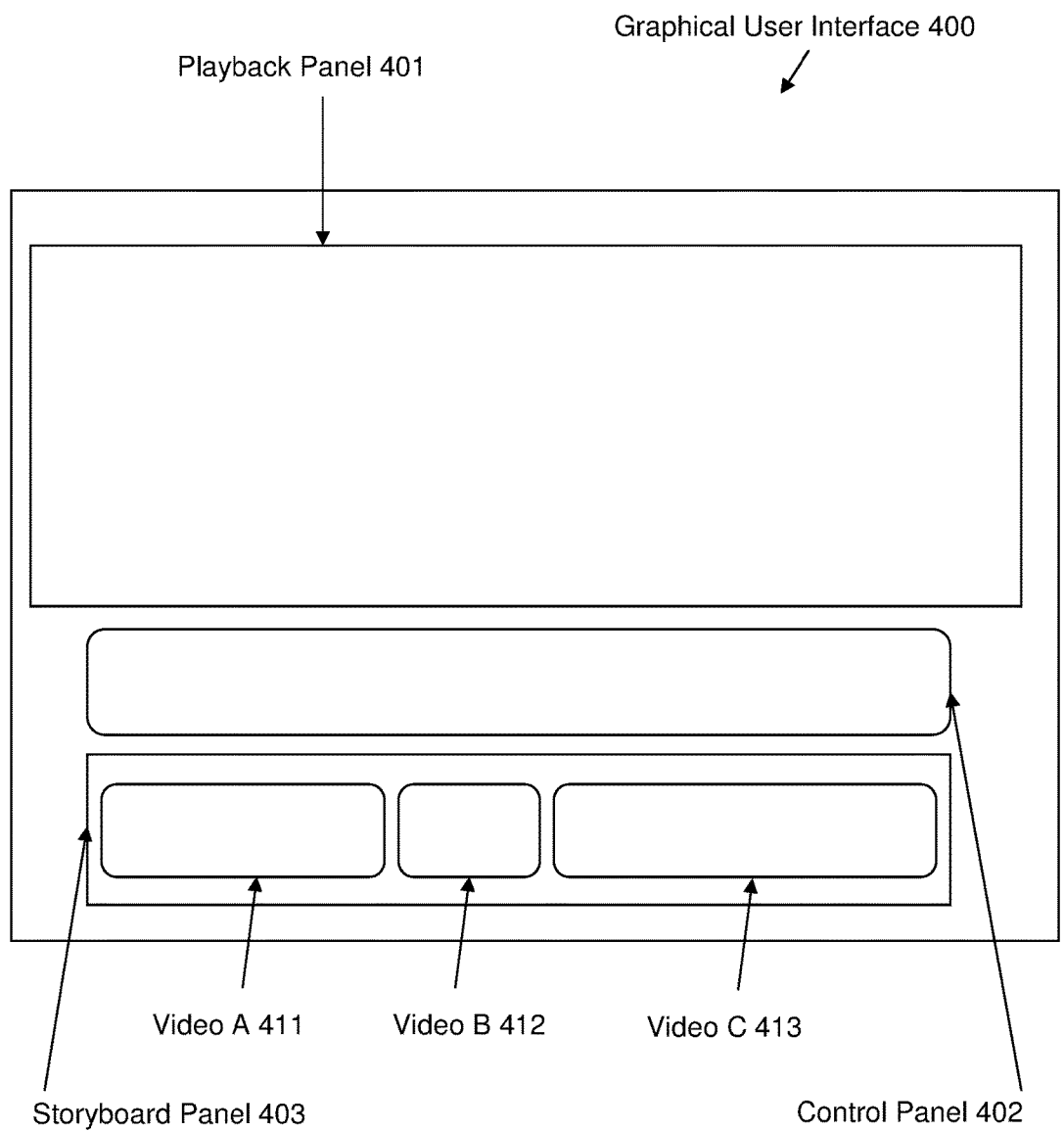
FIG. 4 illustrates an example of a graphical user interface of a video application.

For example, FIG. 4 illustrates an example of graphical user interface 400 of a video application. Graphical user interface 400 may include one or more of playback panel 401, control panel 402, storyboard panel 403, and/or other panels. Individual panels of graphical user interface 400 may present different information. For example, playback panel 401 may present playback of one or more portion of one or more videos. Control panel 402 may present playback options for playback and/or transformation options for transformation of one or more portions of one or more videos. For example, in FIG. 4, control panel 402 may present playback options and/or transformation options for one or more portions of video A 411, video B 412, and/or video C 413.

Storyboard panel 403 may present information related to one or more videos. For example, storyboard panel 403 may present information relating to titles, durations, dates, highlights, and/or other information relating to videos. For example, in FIG. 4, storyboard panel 403 may present information related to video A 411, video B 412, and video C 413. Storyboard panel 403 may present one or more videos based on the order and/or duration of the videos. For example, video A 411, video B 412, and video C 413 may be included in a video presentation. Storyboard panel 403 may present video A 411, video B 412, and video C 413 in the order in which they appear in the video presentation. Storyboard panel 403 may allow a user to change the order of videos. Storyboard panel 403 may present videos based on the durations of videos. For example, the sizes of video A 411, video B 412, and video C 413 in storyboard panel 403 may correspond to the durations of video A 411, video B 412, and video C 413 in the video presentation. Other appearances and types of graphical user interface/panels are contemplated.

Comparison component 108 may be configured to compare interaction information for a portion of a video with one or more criteria for identifying a moment of interest within the video. Based on the comparison, comparison component 108 may be configured to determine whether the interaction information for the portion of the video satisfies one or more criteria for identifying the moment of interest within the video.

Association component 110 may be configured to, responsive to interaction information for a portion of the video indicating one or more user interactions with the portion of the video satisfying one or more criteria, associate a moment in the video corresponding to the portion of the video with the moment of interest. A moment in the video corresponding to the portion of the video may correspond to a point in time within a video or a duration of time within the video. A point in time within a video may correspond to a beginning of the portion of the video, a center of the portion of the video, an end of the portion of the video, or other instant in time within the portion of the video.

Figure 5A:
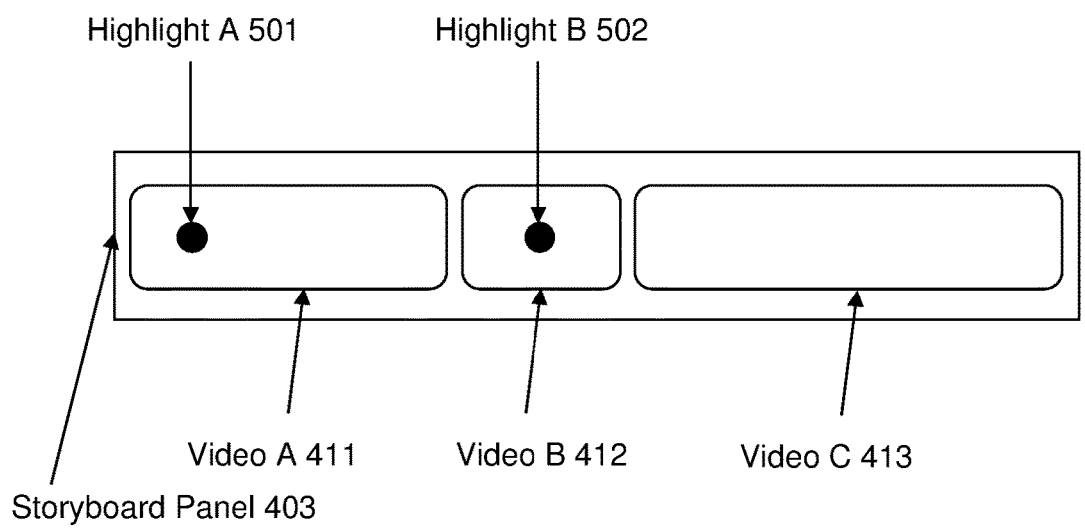
FIGS. 5A-5B illustrate examples of a storyboard panel on a graphical user interface of a video application.
Figure 5B:
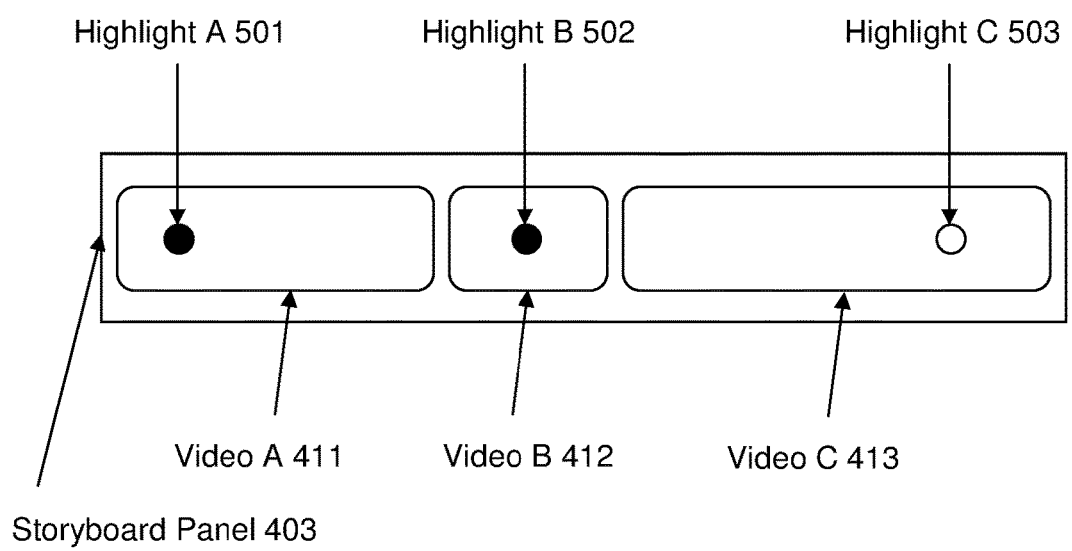

An association of a moment in a video with a moment of interest may be presented via a graphical user interface of a video application. For example, one or more associations of moments in videos with moments of interest may be shown in storyboard panel 403 of FIG. 4. FIGS. 5A-5B illustrate examples of associations of moments in videos with moments of interest shown in storyboard panel 403. Associations of moments in videos with moments of interest may be shown as circles (e.g., highlight A 501, highlight B 502). Other displays of associations of moments in videos with moments of interests are contemplated.

In FIG. 5A, a moment within video A 411 may be associated with a moment of interest (highlight A 501) and a moment within video B 412 may be associated with a moment of interest (highlight B 502). Highlight A 501 and highlight B 502 may be associated by association component 110 based on comparison component 108 determining that interaction information for a portion of video A 411 corresponding to highlight A 501 satisfied one or more criteria and that interaction information for a portion of video B 412 corresponding to highlight B 502 satisfied one or more criteria. Video A 411, video B 412, and/or video C 413 may include other associations.

For example, interaction information for a portion of video A 411 may indicate a user interaction with the portion of video A 411 to save a still image (e.g., via image extraction) from video A. Based on this interaction information satisfying one or more criteria, association component 110 may associate a point in time corresponding to the still image with a moment of interest as highlight A 501. Interaction information for a portion of video B 412 may indicate a user interaction with the portion of video B 412 to select the portion of video B 412 (e.g., selecting a portion of video B 412 between 0.5 seconds and 5 seconds time interval). Based on this interaction information satisfying one or more criteria, association component 110 may associate a point in time corresponding to a center of the portion of video B 412 (e.g., 2.75 second mark of video B 412) with a moment of interest as highlight B 502.

In some implementations, a graphical user interface of a video application may display highlight moments based on user tagging. For example, graphical user interface 400 may display highlight moments based on direct markings of moments corresponding to portions of videos as moments of interest, user comments corresponding to portions of videos, user labeling corresponding to portions of videos, and/or other user tags. User tagging may be accomplished during capture of a video or after capture of a video.

In some implementations, association component 110 may be configured to prompt a user's approval of associating a moment in a video corresponding to a portion of the video with a moment of interest. Association component 110 may allow a user to individually approve association of individual moments in the video with moments of interest and/or approval some or all of associations at once. For example, association component 110 may present to the user the associations made in a chronological order and/or based on types of moments of interest. Association component 110 may allow a user to accept all associations by saving a copy of a video with new associations. Responsive to reception of the user's approval, association component 110 may be configured to confirm the association of the moment in the video corresponding to the portion of the video with the moment of interest. Responsive to refusal of the user approval, association component 110 may be configured to remove the association(s).

For example, in FIG. 5B, storyboard panel 403 may display highlight A 501, highlight B 502, and highlight C 503. Associations of highlight A 501 and highlight B 502 may have been confirmed by a user. Association of highlight C 503 may not have been confirmed by a user. Confirmed associations and unconfirmed associations may be displayed differently. For example, confirmed associations and unconfirmed associations may be shown in different colors (e.g., yellow for confirmed association and blue for unconfirmed association, etc.). Confirmed associations and unconfirmed associations may be shown in different shapes (e.g., circle for confirmed association and square for unconfirmed association, solid circle for confirmed association and dotted circle for unconfirmed association, etc.). Other ways of distinguishing confirmed associations from unconfirmed associations are contemplated.

Figure 6:
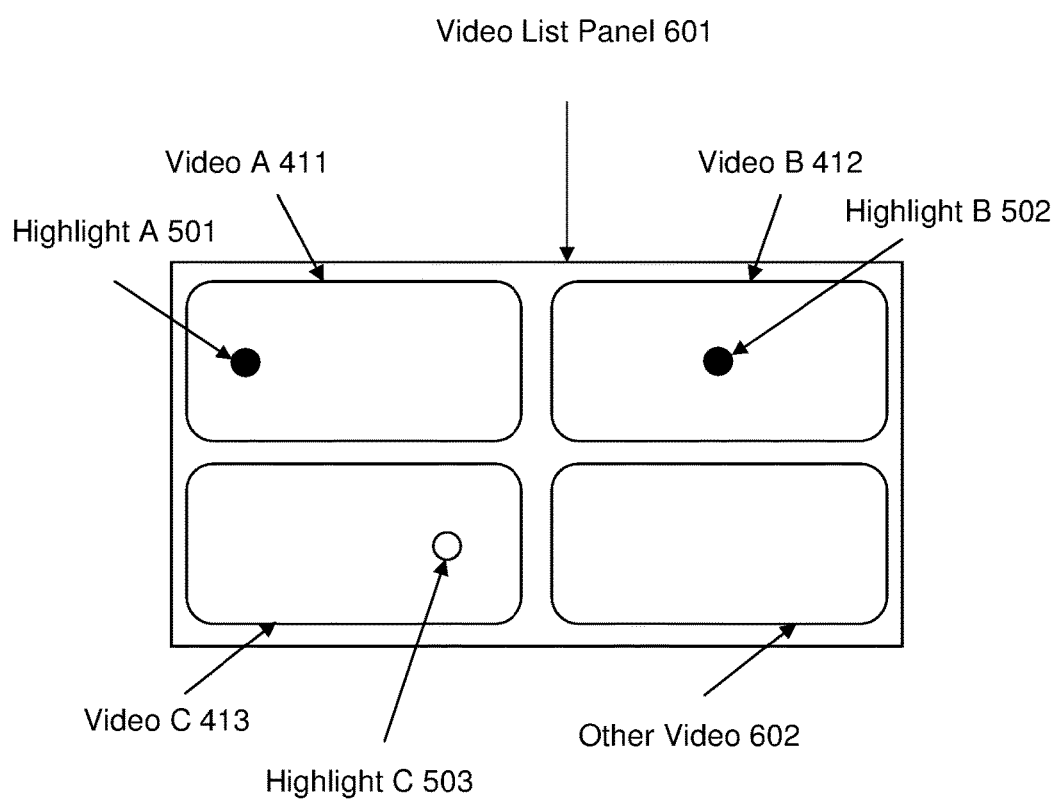
FIG. 6 illustrates an example of a video list panel on a graphical user interface of a video application.

In some implementations, associations of moments in a video with moments of interest may be shown in other parts of graphical user interface 400. For example, graphical user interface 400 may include video list panel 601 (shown in FIG. 6). Video list panel 601 may present one or more videos for inclusion in a video presentation. For example, video list panel 601 may allow a user to select video A 411, video B 412, video C 413, and/or other video 602 for inclusion in a video presentation shown in storyboard panel 403. Video list panel 601 may display associations of a moment in a video with a moment of interest. For example, in FIG. 6, video list panel 601 may display highlight A 501 in video A 411, highlight B 502 in video B 412, and highlight C 503 in video C 413.

In some implementations, associate component 110 may be configured to indicate a type of moment of interest. A type of moment of interest may indicate criteria satisfied by the interaction information or a classification of criteria satisfied by the interaction information. For example, association component 110 may tag a highlight moment with information that indicates the criteria satisfied by the interaction information. Association component 110 may tag a highlight moment with information based on classification of criteria satisfied by the interaction information. In some implementations, the type of moment of interest may be shown on a graphical user interface of a video application.

In some implementations, association component 110 may be further configured to, responsive to interaction information for a portion of the video indicating one or more user interactions with the portion of the video satisfying one or more criteria, associate a moment in a high resolution video corresponding to the portion of the video with the moment of interest. The high resolution video may be characterized by a higher resolution than the video. The high resolution video may be characterized by a higher framerate than the video.

For example, camera 32 (shown in FIG. 3) may include a video and a high resolution video. The high resolution video may have been captured by camera 32 and the video (having a lower resolution and/or lower framerate than the high resolution video) may have been generated from the high resolution video. Camera 32 may access the video and obtain one or more criteria for identifying a moment of interest within the video. A user may operate camera 32 to interact with the video and camera 32 may compare interaction information for a portion of the video with one or more criteria. Responsive to the interaction information satisfying one or more criteria, camera 32 may associate a moment in the video corresponding to the portion of the video with the moment of interest and associate a moment in the high resolution video corresponding to the portion of the video with the moment of interest.

As another example, camera 32 may include a video and a high resolution video, and camera 32 may send the video to mobile device 33. Mobile device 33 may access the video and obtain one or more criteria for identifying a moment of interest within the video. A user may operate mobile device 33 to interact with the video and mobile device 33 may compare interaction information for a portion of the video with one or more criteria. Responsive to the interaction information satisfying one or more criteria, mobile device 33 may associate a moment in the video corresponding to the portion of the video with the moment of interest and associate a moment in the high resolution video corresponding to the portion of the video with the moment of interest. Mobile device 33 may indirectly associate the moment in the high resolution video with the moment of interest. For example, mobile device 33 may send one or more commands to camera 32 to associate the moment in the high resolution video with the moment of interest. Mobile device 33 may send information relating to association of the moment in the video with the moment of interest to camera 32. Camera 32 may use the information relating to association of the moment in the video with the moment of interest to associate the moment in the high resolution video with the moment of interest.

While the present disclosure may be directed to videos, one or more other implementations of the system may be configured for other types media content. Other types of media content may include one or more of audio content (e.g., music, podcasts, audio books, and/or other audio content), multimedia presentations, photos, slideshows, and/or other media content.

Although processor 11 and electronic storage 12 are shown to be connected to an interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, and/or 110 may be eliminated, and some or all of its functionality may be provided by other computer program components. As another example, processor 11 may be configured to execute one or more additional computer program components that may perform some or all of the functionality attributed to one or more of computer program components 102, 104, 106, 108, and/or 110 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
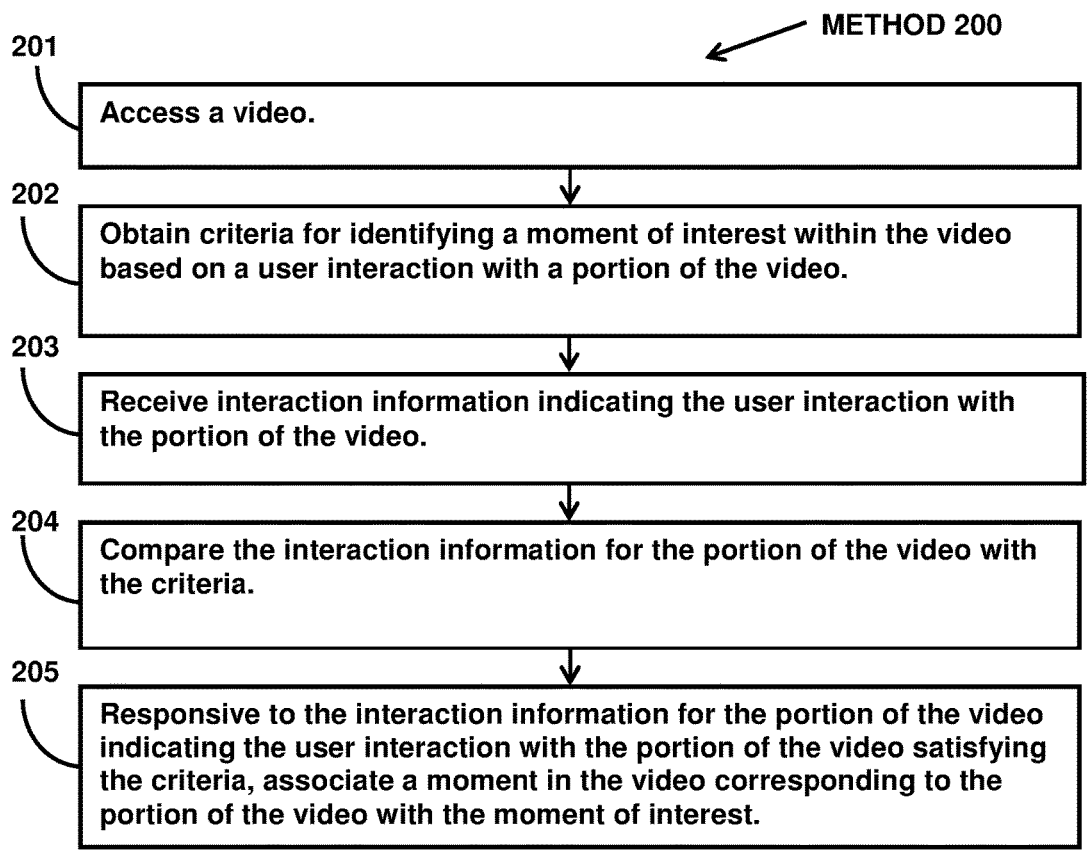
FIG. 2 illustrates a method for generating highlights for a video.

FIG. 2 illustrates method 200 for generating highlights for a video. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, a video may be accessed. A video may be accessed from electronic storage and/or from other locations. In some implementations, operation 201 may be performed by a processor component the same as or similar to access component 102 (shown in FIG. 1 and described herein).

At operation 202, criteria for identifying a moment of interest within a video may be obtained. A moment of interest within a video may be identified based on a user interaction with a portion of the video. A user interaction with a portion of a video may include a consumption of the portion of the video, a transformation of the portion of the video, and/or the other user interactions with the portion of the video. In some implementations, operation 202 may be performed by a processor component the same as or similar to criteria component 104 (shown in FIG. 1 and described herein).

At operation 203, interaction information indicating the user interaction with the portion of the video may be received. Interaction information may be received at a time or over a period of time. In some implementations, operation 203 may be performed by a processor component the same as or similar to interaction information component 106 (shown in FIG. 1 and described herein).

At operation 204, the interaction information for the portion of the video may be compared with the criteria. In some implementations, operation 204 may be performed by a processor component the same as or similar to comparison component 108 (shown in FIG. 1 and described herein).

At operation 205, responsive to the interaction information for the portion of the video indicating the user interaction with the portion of the video satisfying the criteria, a moment in the video corresponding to the portion of the video may be associated with the moment of interest. In some implementations, operation 205 may be performed by a processor component the same as or similar to association component 110 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating highlights for a video, the system comprising:
    one or more physical processors configured by machine-readable instructions to:
        access a file defining the video;
        obtain criteria for identifying a moment of interest within the video based on a user interaction with a portion of the video, the portion of the video including one or more images;
        receive interaction information indicating the user interaction with the portion of the video;
        compare the interaction information for the portion of the video with the criteria; and
        responsive to the interaction information for the portion of the video indicating the user interaction with the portion of the video satisfying the criteria, associate a moment in the video corresponding to the portion of the video with the moment of interest;
        wherein the interaction information for the portion of the video satisfies the criteria based on the user interaction including repeated viewing of the portion of the video a given number of times within a threshold duration of time after the video has been captured at a first time such that:
        the threshold duration of time extends from the first time to a second time after the first time;
        responsive to the user interaction including repeated viewing of the portion of the video between the first time and the second time, the moment in the video corresponding to the portion of the video is associated with the moment of interest; and
        responsive to the user interaction including repeated viewing of the portion of the video after the second time, the moment in the video corresponding to the portion of the video is not associated with the moment of interest.

2. The system of claim 1, wherein the one or more physical processors are further configured to, responsive to the interaction information for the portion of the video indicating the user interaction with the portion of the video satisfying the criteria, associate a moment in a high resolution video corresponding to the portion of the video with the moment of interest, the high resolution video characterized by a higher resolution than the video.

3. The system of claim 1, wherein the interaction information for the portion of the video indicating the user interaction with the portion of the video satisfies the criteria further based on a sharing of the portion of the video.

4. The system of claim 1, wherein the interaction information for the portion of the video indicating the user interaction with the portion of the video satisfies the criteria further based on a timing modification of the portion of the video.

5. The system of claim 1, wherein the interaction information for the portion of the video indicating the user interaction with the portion of the video satisfies the criteria further based on pausing of the viewing during the portion of the video for at least a duration of time, the duration of time including a maximum duration after which the criteria is not satisfied.

6. The system of claim 1, wherein the interaction information for the portion of the video indicating the user interaction with the portion of the video satisfies the criteria further based on a pointer being hovered over the portion of the video for at least a duration of time, the duration of time including a maximum duration after which the criteria is not satisfied.

7. The system of claim 1, wherein the interaction information for the portion of the video indicating the user interaction with the portion of the video satisfies the criteria further based on warping or blurring of the one or more images.

8. The system of claim 1, wherein the interaction information for the portion of the video indicating the user interaction with the portion of the video satisfies the criteria further based on an audio modification of the portion of the video.

9. The system of claim 1, wherein the interaction information for the portion of the video indicating the user interaction with the portion of the video satisfies the criteria further based on addition of one or more transition effects between the one or more images.

10. The system of claim 1, wherein the interaction information for the portion of the video indicating the user interaction with the portion of the video satisfies the criteria further based on addition of text or other images to the one or more images.

11. A method for generating highlights for a video, the method comprising:
accessing a file defining the video;
obtaining criteria for identifying a moment of interest within the video based on a user interaction with a portion of the video, the portion of the video including one or more images;
receiving interaction information indicating the user interaction with the portion of the video;
comparing the interaction information for the portion of the video with the criteria; and
responsive to the interaction information for the portion of the video indicating the user interaction with the portion of the video satisfying the criteria, associating a moment in the video corresponding to the portion of the video with the moment of interest;
wherein the interaction information for the portion of the video satisfies the criteria based on the user interaction including repeated viewing of the portion of the video a given number of times within a threshold duration of time after the video has been captured at a first time such that:
the threshold duration of time extends from the first time to a second time after the first time;
responsive to the user interaction including the repeated viewing of the portion of the video between the first time and the second time, the moment in the video corresponding to the portion of the video is associated with the moment of interest; and
responsive to the user interaction including the repeated viewing of the portion of the video after the second time, the moment in the video corresponding to the portion of the video is not associated with the moment of interest.

12. The method of claim 11, further comprising, responsive to the interaction information for the portion of the video indicating the user interaction with the portion of the video satisfying the criteria, associating a moment in a high resolution video corresponding to the portion of the video with the moment of interest, the high resolution video characterized by a higher resolution than the video.

13. The method of claim 11, wherein the interaction information for the portion of the video indicating the user interaction with the portion of the video satisfies the criteria further based on a sharing of the portion of the video.

14. The method of claim 11, wherein the interaction information for the portion of the video indicating the user interaction with the portion of the video satisfies the criteria further based on a timing modification of the portion of the video.

15. The method of claim 11, wherein the interaction information for the portion of the video indicating the user interaction with the portion of the video satisfies the criteria further based on pausing of the viewing during the portion of the video for at least a duration of time, the duration of time including a maximum duration after which the criteria is not satisfied.

16. The method of claim 11, wherein the interaction information for the portion of the video indicating the user interaction with the portion of the video satisfies the criteria further based on a pointer being hovered over the portion of the video for at least a duration of time, the duration of time including a maximum duration after which the criteria is not satisfied.

17. The method of claim 11, wherein the interaction information for the portion of the video indicating the user interaction with the portion of the video satisfies the criteria further based on warping or blurring of the one or more images.

18. The method of claim 11, wherein the interaction information for the portion of the video indicating the user interaction with the portion of the video satisfies the criteria further based on an audio modification of the portion of the video.

19. The method of claim 11, wherein the interaction information for the portion of the video indicating the user interaction with the portion of the video satisfies the criteria further based on addition of one or more transition effects between the one or more images.

20. The method of claim 11, wherein the interaction information for the portion of the video indicating the user interaction with the portion of the video satisfies the criteria further based on addition of text or other images to the one or more images.

* * * * *